(12) United States Patent
Nair et al.

(10) Patent No.: US 7,028,212 B1
(45) Date of Patent: Apr. 11, 2006

(54) NETWORK DEVICE AND METHOD OF OPERATION

(75) Inventors: Dileep Kumar Narayanan Nair, San Leandro, CA (US); Sunil Bhupatrai Mehta, Mountain View, CA (US); Anurag Dhingra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 624 days.

(21) Appl. No.: 10/215,937

(22) Filed: Aug. 8, 2002

(51) Int. Cl.
*G06F 11/00* (2006.01)

(52) U.S. Cl. .......................................... 714/4; 703/23

(58) Field of Classification Search ............... 714/4; 703/23; 718/104, 105
See application file for complete search history.

(56) References Cited

U.S. PATENT DOCUMENTS 5,535,326 A * 7/1996 Baskey et al. ............... 714/4
6,068,661 A * 5/2000 Shari ......................... 703/27
6,324,590 B1 * 11/2001 Jeffords et al. ............. 719/316
6,427,170 B1   7/2002 Sitaraman et al.
6,587,969 B1 * 7/2003 Weinberg et al. ............ 714/46

OTHER PUBLICATIONS

Cisco RPMS Concepts, Aug. 12, 2001.
Cisco RPMS System Architecture, Jul. 10, 2001.

* cited by examiner

*Primary Examiner*—Robert Beausoliel
*Assistant Examiner*—Yolanda L Wilson
(74) *Attorney, Agent, or Firm*—Marger Johnson & McCollom

(57) ABSTRACT

A network device to maintain resource management within a network may comprise an emulator or watchdog that may send an emulation request to a resource manager for emulating a request of a client. Operability of the resource manager may be identified based on a reply of the resource manager to the emulation request. If the resource manager does not provide a response within a given time frame, then the watchdog may identify a failure condition for the resource manager. The watchdog may then initiate corrective actions for replacing the resource manager with a backup server responsive to identifying the fail condition.

33 Claims, 4 Drawing Sheets

NETWORK DEVICE AND METHOD OF OPERATION

BACKGROUND OF THE INVENTION

The present disclosure is related to network devices and, more particularly, to resource servers and their methods of operation for continued management of network resources.

When managing resources of a network, a resource server such as a Resource Pool Manager Server (RPMS) may count, control and otherwise manage allocations of the network resources. Such a resource server may establish how the Internet or other network resources may be shared, distributed and allocated to different users that may call into different telephone companies or Internet Service Providers (ISPs). The telephone companies and Internet or other network service providers may be referenced as customers of a wholesale Internet or other network provider.

Integrated with the network, the resource server may collect information regarding different customers and their use of the network resources, e.g., across one or more network access servers (NAS). By tracking the customer usage within the network, the resource server may effectively administer the delivery of network services to the customers. Such services may include Virtual Private Dial-Up Network (VPDN) services and/or retail dial network services.

Referencing a conventional network 100 of FIG. 1, resource server 104 may be configured with a variety of customer profiles to assist customer differentiation. An incoming call of a user 110-A may reach a network access server 106. The resource server may then associate the call, in accordance with the incoming call-in number, with a customer profile of resource server 104. The resource server may then determine whether the network access server 106 should answer or reject the incoming call. If the call is to be answered, the resource server may also establish parameters for handling of the call. For example, the user profile may trigger an assignment of the call to particular resources of a group (e.g., tunnel(s)) as may have been previously established by the resource manager.

Each configured customer profile, which may be stored within resource server 104, may include information of the number of resources actively in use by a contract customer. The customer profile may also include information, e.g., such as an upper number of sessions or ports 108 that may be initiated by a given customer. In operation, the resource server may increment and decrement the session counter for given customers as each session begins or concludes for the customers. Additionally, the resource server may query whether a new call to a customer would exceed the maximum number of ports available to the customer. Accordingly, the customer profile may influence handling of the call, e.g., whether it may be answered or forwarded to an appropriate destination.

Additionally, the resource server 104 may use the customer profile to determine whether to direct the call from a given user 110 to a local authentication, authorization and accounting (AAA) server of the Internet or other network application. Further, it may assist direction of the call to a tunnel that may have been pre-established, e.g., as part of a wholesale virtual private dial-up network (VPDN) service.

The resource server 104 may, thus, manage the use of available network resources across multiple Network Access Servers (NASes) 106, and may implement various resource allocation schemes. The server may allow a combination of NAS resource groups with call types (e.g., speech, digital, V.110, and V.120) and might also enable optional resource modem services into resource data assignments.

Resource groups may be configured on a NAS 106 and assigned by the resource server 104 in accordance with its identified customer profiles. For example, the groups of resources may represent groupings of similar hardware and/or services that may remain fixed on a per-call basis. Such resource groups may be identified by physical location, e.g., such as a range of port/slot numbers 108 (for example, port-based modems or terminal adapters). Alternatively, the resource groups may be associated by a single parameter (for example, HDLC framer or V.120 terminal adapter).

In general, resource server 104 and network access servers 106 communicate with one another using a common protocol, e.g., a Resource Manager Protocol (RMP). Using the common protocol, the access devices (e.g. such as a Network Access Server or NAS) may, as clients 106, communicate resource management requests to the resource server 104. Additionally, the protocol may allow the resource server to periodically query the client access devices and update its information regarding active calls of the access devices for association with customer profiles being maintained within the resource server.

Conventional management tools and conventional network devices may have difficulty determining erroneous conditions that may lead to a failed resource server and, additionally, may have difficulty in being sufficiently responsive to enable replacement of the primary resource server 104 with a back-up resource server 106 in a manner that may enable sustained servicing of calls to the network.

SUMMARY

In accordance with an embodiment of the present invention, a method of maintaining resource management within a network may comprise sending an emulation request to a resource manager for emulating a client request. An operability of the resource manager may be identified based upon a reply of the resource manager to the emulation request. If the resource manager does not provide a response within a predetermined duration, then a fail condition may be identified.

In accordance with a further embodiment of the present invention, a response of the resource manager may be compared to predetermined data. The operability of the resource manager may then be determined based upon both receipt and accuracy of the reply.

In accordance with a further embodiment, corrective actions may be initiated responsive to identifying a failed condition. For example, an alert message may be sent to an administrator, or a process may be initiated for replacing the resource manager with a backup resource manager or server.

In accordance with a further embodiment, a second emulation request may be sent to the resource manager from a source different from the first emulation request. The operability of the resource manager may be further based upon its responsiveness to both the first and second emulation requests. Upon identifying an error, additional analysis may be provided to determine an operability of at least one of the resource manager or a network between the resource manager the source of the second request.

BRIEF DESCRIPTION OF THE DRAWINGS

Embodiments and features of the invention will become apparent from the detailed description and the appended claims, with reference to the accompanying drawings, in which:

DETAILED DESCRIPTION

In the following description, exemplary embodiments of the invention may be described with regard to process steps and data structures. However, those skilled in the art will recognize upon reading the present disclosure that embodiments of the invention may be implemented using at least one general purpose computer operating under program control. Additionally, modifications of such computer, which may be made to implement the components, process steps, and/or data structures described herein, are understood to be within the scope of the present invention.

As used herein, "machine" may reference a device that may be operable in a network such as, a gateway, server, router, switching unit, computer or the like.

"NAS" may reference a Network Access Server.

"Wholesaler" may reference a network owner. In general, a wholesaler may lease resources of a wholesale network to customers and retailers such as Internet or other network service providers. A user typically gains entry to such network through a port, which may be associated with one of several different customers.

"Resource server" may be referenced alternatively herein as "resource manager," "response pool manager," "resource pool server," "resource pool manager server (RPMS)" or simply "server."

Figure 1:
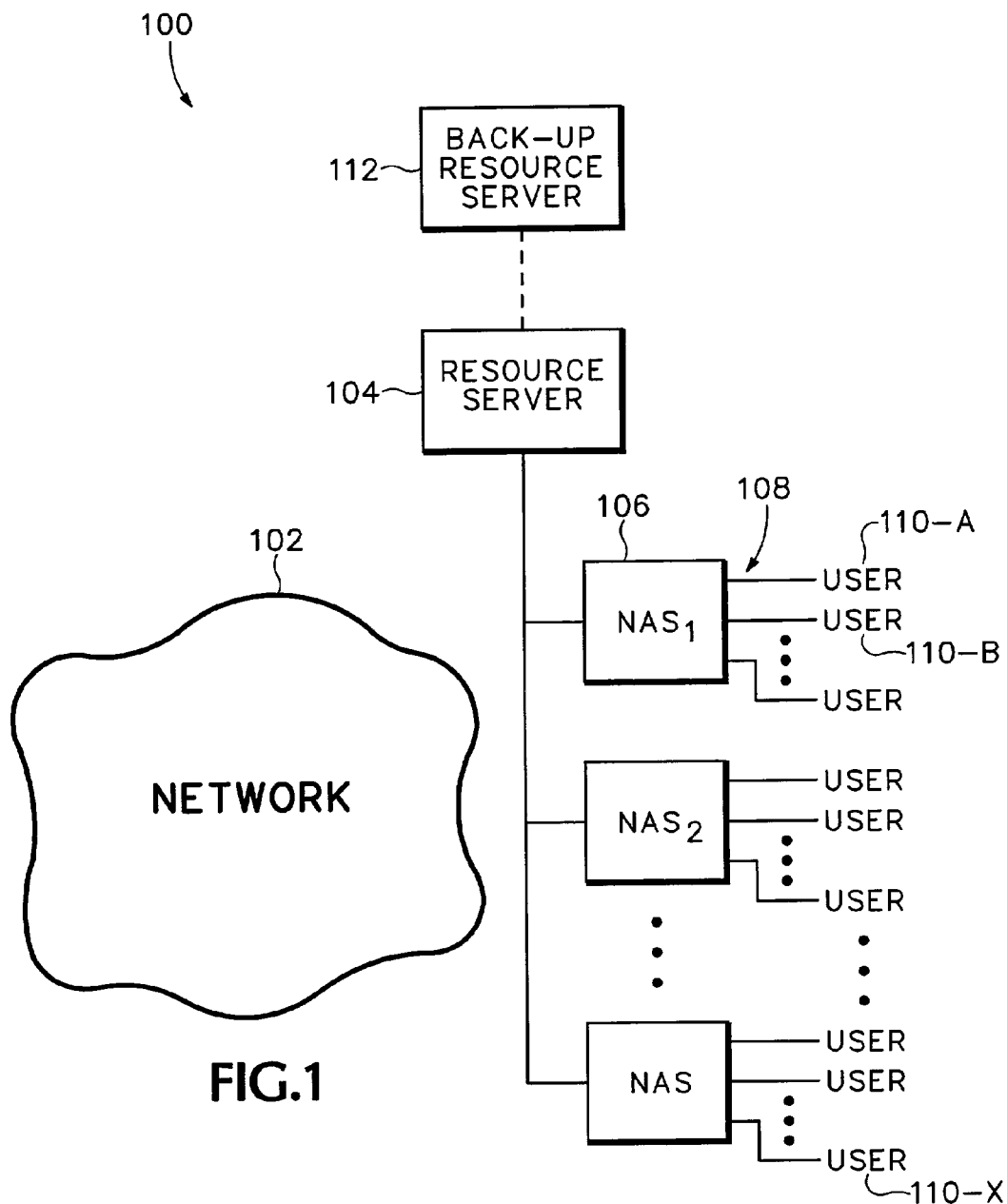
FIG. 1 shows a simplified schematic diagram for a conventional embodiment of a wholesale network.
Figure 2:
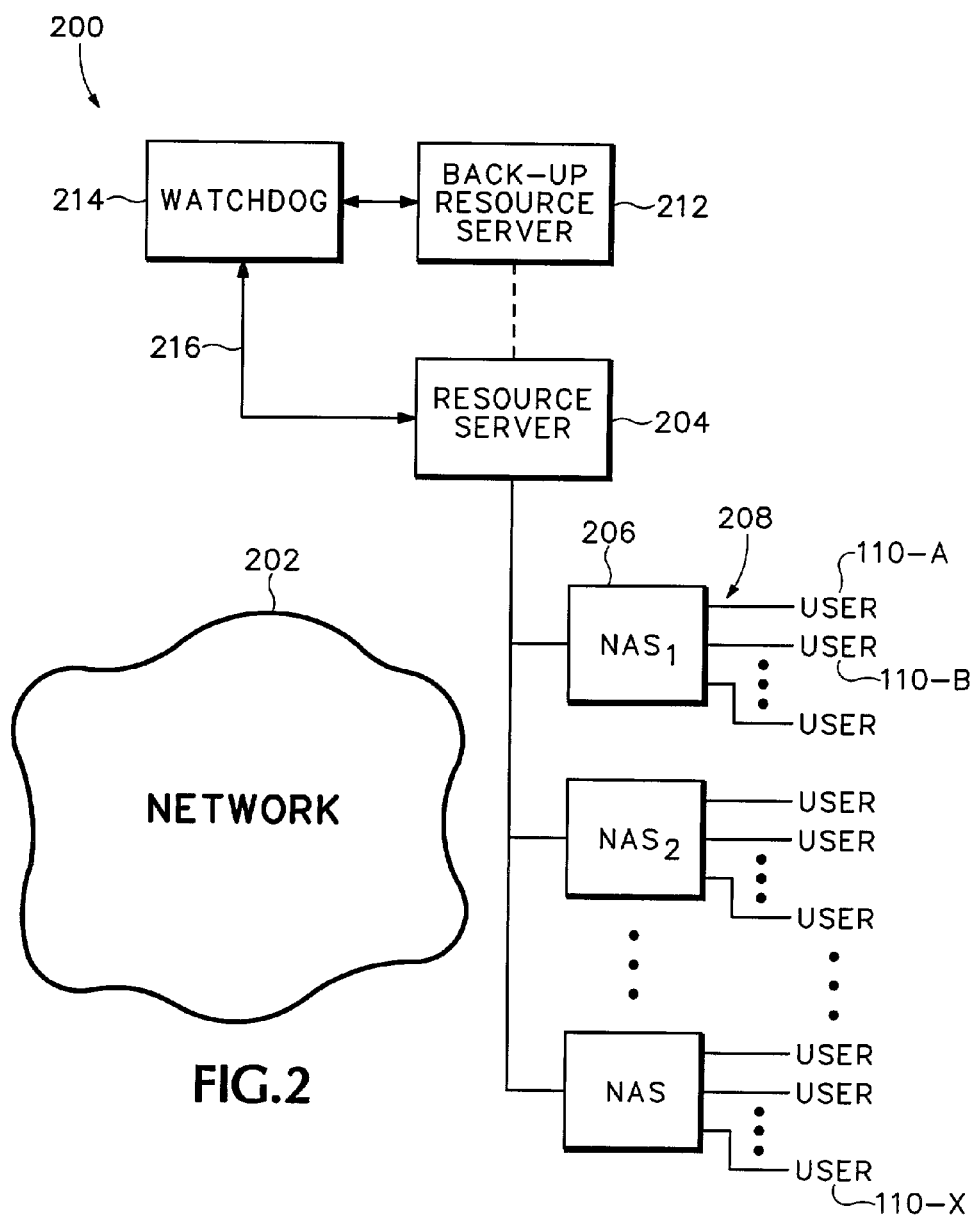
FIG. 2 shows a simplified block diagram for a wholesale network in accordance with an embodiment of the present invention.

Referencing FIG. 2, resource server 204 may be viewed as an important element to the delivery of wholesale voice or dial up Internet or other network service. In a particular embodiment, resource server 204 may comprise a Cisco Resource Pool Manager Server (RPMS), which may be available from Cisco. When a user 110 makes a call to Internet or other network 200, the call may be terminated by network 202. For example, user 110-A may dial-in with a number for connecting to an Internet or other network service provider (ISP) such as, AOL. Another user 110-B may then be configured to call-in to a different ISP such as MSN. The Network Access Servers (NASes) 206 may receive and service these calls in accordance with pre-established customer profiles and guidelines of resource server 204.

Although the number of NASes and associated ports for access to network 202 may be large; their number and availability, nonetheless, are finite. Because these resources of wholesale network 202 may be limited, a NAS 206 may first query resource server 204 for permission to complete a task of answering and servicing of an incoming call. Upon receiving permission from resource server 204, NAS 206 may assign and allocate a specific port 208 to, e.g., a specific customer associate with the call-in source, such as an AOL customer for servicing the customer's user 110-A.

Further referencing FIG. 2, NAS 206 may identify whether the call-in number may be associated with a particular customer (i.e., such as an AOL or MSN Internet or other network service provider). The NAS may then allocate its resources, such as a port, tunnel, bandwidth, etc. for servicing user 110-A in accordance with pre-established contract provisions for the associated customer (e.g., AOL).

For example, a customer (e.g., such as AOL or MSN) may lease a certain number of ports from the wholesale provider for accessing network 202. The wholesale provider, in-turn, may establish an availability of such number of leased ports to the customer. NASes 206 and resource server 204, accordingly, work together to coordinate an allocation of resources in-line with the pre-established contract provisions.

In a particular example, a first customer, may comprise an Internet or other network service provider such as AOL, which may lease 2000 ports. Accordingly, 2000 AOL users 110-A may be able to connect to the wholesale Internet or other network at a given time. A second customer, such as an Internet or other network service provider MSN, may lease 5000 ports, thus allowing 5000 MSN users 110-B to be actively connected to the wholesale Internet or other network. The resource server, thus, may need operability to assign, allocate and configure respective terminations at the NAS ports for such potential users in accordance with these pre-established contract provisions. Active call counts and maximum available allocations may be maintained in their respective customer profiles.

So when an incoming call arrives, it may be identified to a particular customer such as AOL or MSN. But, before connecting the call, NAS 206 may first send a request to the resource server 204, to check how many active ports have already been allocated to the customer and to determine if the active count is below the maximum available number previously established for the customer. If the resource server determines an additional availability of port(s), it may permit answering and servicing of the incoming call in accordance with provisions of the customer profile. Absent an available port, resource manager 204 may instruct the NAS to reject the call.

Resource manager may also have a limited speed by which it may service incoming calls. In other words, the resource manager server may have a maximum number of call servicings that it may coordinate per second. For example, the server may have a load capability of 120 incoming calls per second; wherein, only 120 calls per second may be processed for connection to the Internet or other network.

If resource manager 204 should fail or begin to fail, it may be understood that user calls may not be able to connect to the wholesale network. In other words, NASes 206 may send requests to resource manager 204, but the requests might not be answered. Accordingly, the call may be left hanging or unanswered.

However, even when an incoming call exceeds the number of leased allocations to a given user, it may still be important that the server instruct the NAS to offer some kind of feedback to the user. Accordingly, the resource manager may send an instruction to the NAS to instruct it to not only reject the call, but to also provide a reply such as, e.g., providing a busy tone. Accordingly, responsiveness of resource manager 204 may remain an important component to effective network operations.

In some conventional procedures, a backup resource server may be made available for the replacement of a primary resource server. To enable ready replacement, the backup may need updating of its call counts. As used herein, such call-count updating procedures may be referenced as "synching." Through synching, active calls of the NASes to respective customers may be determined and used to update the customer call counts within the resource servers. But such synching procedures may be costly in consideration of the amount of time, overhead and lost availability of network resources during the synching procedures.

In accordance with certain embodiments of the present invention, a primary resource server or manager 204 may be monitored to determine a failure or conditions indicative of performance loss. Responsive to determining a failure, remedial measures may be initiated to assist sustained resource management, Internet or other network servicing and operability. A backup resource manager 212 may be synched just before replacement of primary server 204. In other embodiments, a backup may not be available, and a process may be triggered to restart a primary resource manager.

Referencing FIG. 2, a watchdog 214 may emulate a NAS, or client, and may send an emulation request to the resource server 204. The resource server may receive and process the emulation request just like any other request. In this embodiment, the server may be unaware of the origination of the emulation request. The resource server may, thus, exercise its internal routines, threads and logic just as it would a request for any other NAS or client.

After sending the emulation request, watchdog 214 may wait for a reply. If a reply is not received within a given duration, (e.g., as may be determined from other NAS settings), the watchdog may identify an error and may begin follow-on procedures. In one embodiment, the watchdog may initiate corrective actions. In other embodiments, the watchdog may first send additional requests to solicit a response before it identifies a failure.

In a particular embodiment, the watchdog may wait a duration of, e.g., approximately five seconds. If a reply is not received, it may send second and third requests. If these requests also remain unanswered, watchdog 214 may initiate subsequent corrective actions.

In a further embodiment, the watchdog may be configured with parameters corresponding to those of the other NASes, or clients, so that it may substantially emulate their characteristics. The durations for expected replies, protocols, call types, etc., may be established (e.g., previously programmed, configured, embodied) within the watchdog to enable emulation of the clients.

Figure 3:
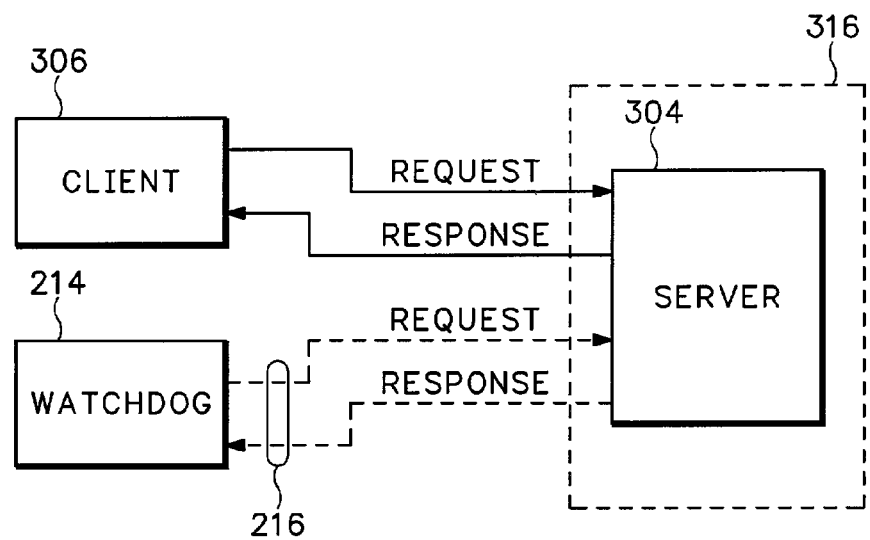
FIG. 3 shows a block diagram of a server-client model incorporating a watchdog in accordance with an embodiment of the present invention.

In a particular embodiment, referencing FIG. 3, the emulating tool (i.e., watchdog 214) may comprise a software utility to emulate a client 306, such as a NAS. In other embodiments, the watchdog may comprise a hardware circuit, state machine, computer or combinations thereof, singularly or taken together with software provisions. In one embodiment, watchdog 214 may reside in a machine separate and remote from machine 316 of server 304. Alternatively, watchdog 214 may reside in a machine the same as the primary server.

When running in a machine remote from the primary resource server, referencing FIG. 3, watchdog 214 may not be able to determine if a failure is due to a faulty network communication channel 216 or if it may be due to server 304. When a reply is not received by the watchdog, it could be that the resource server 304 may be down or the network connection 216 between the watchdog and resource server may be broken. Therefore, secondary tools may be incorporated to further resolve the error to one of a faulty network communication channel or disabled server.

Figure 4:
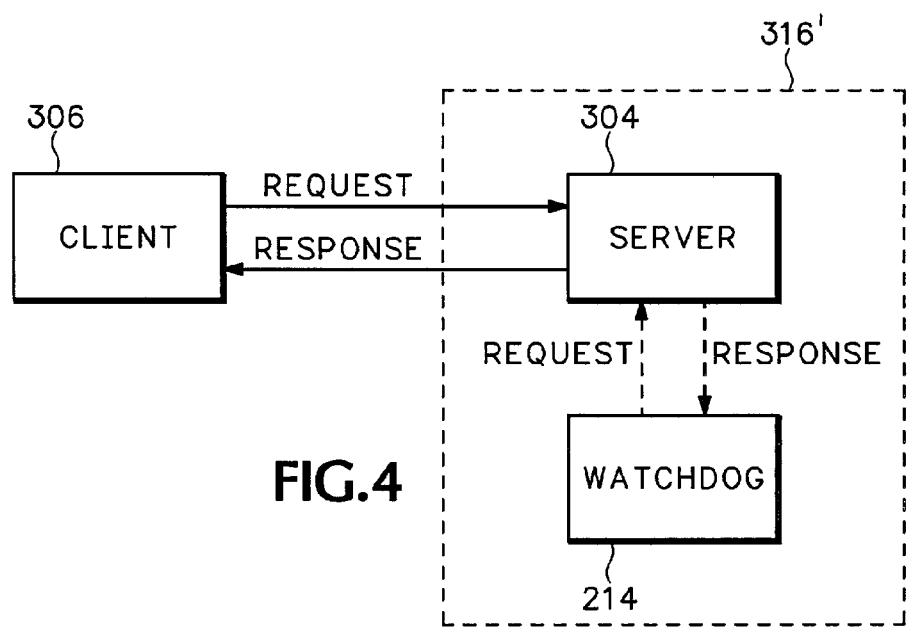
FIG. 4 shows a simplified block diagram of a server-client model with a watchdog in accordance with another embodiment of the present invention.

Referencing FIG. 4, when watchdog 214 is in a machine 316' the same as that of server 304, it may resolve more directly a faulty server. For example, in a particular embodiment, watchdog 214 may comprise a software module that is operating in a computer the same as that for running a program module for primary server 304. If the watchdog determines an error, it may recognize that there are no network contingencies and may, therefore, begin immediately to initiate corrective actions.

In certain embodiments of the present invention, watchdog 214 may examine the contents of a reply to determine if it follows an appropriate protocol and/or if the reply provides accurate data. Accordingly, watchdog 214 may identify the operability of a resource server based upon at least one of the receipt, protocol and accuracy of the reply.

Figure 5:
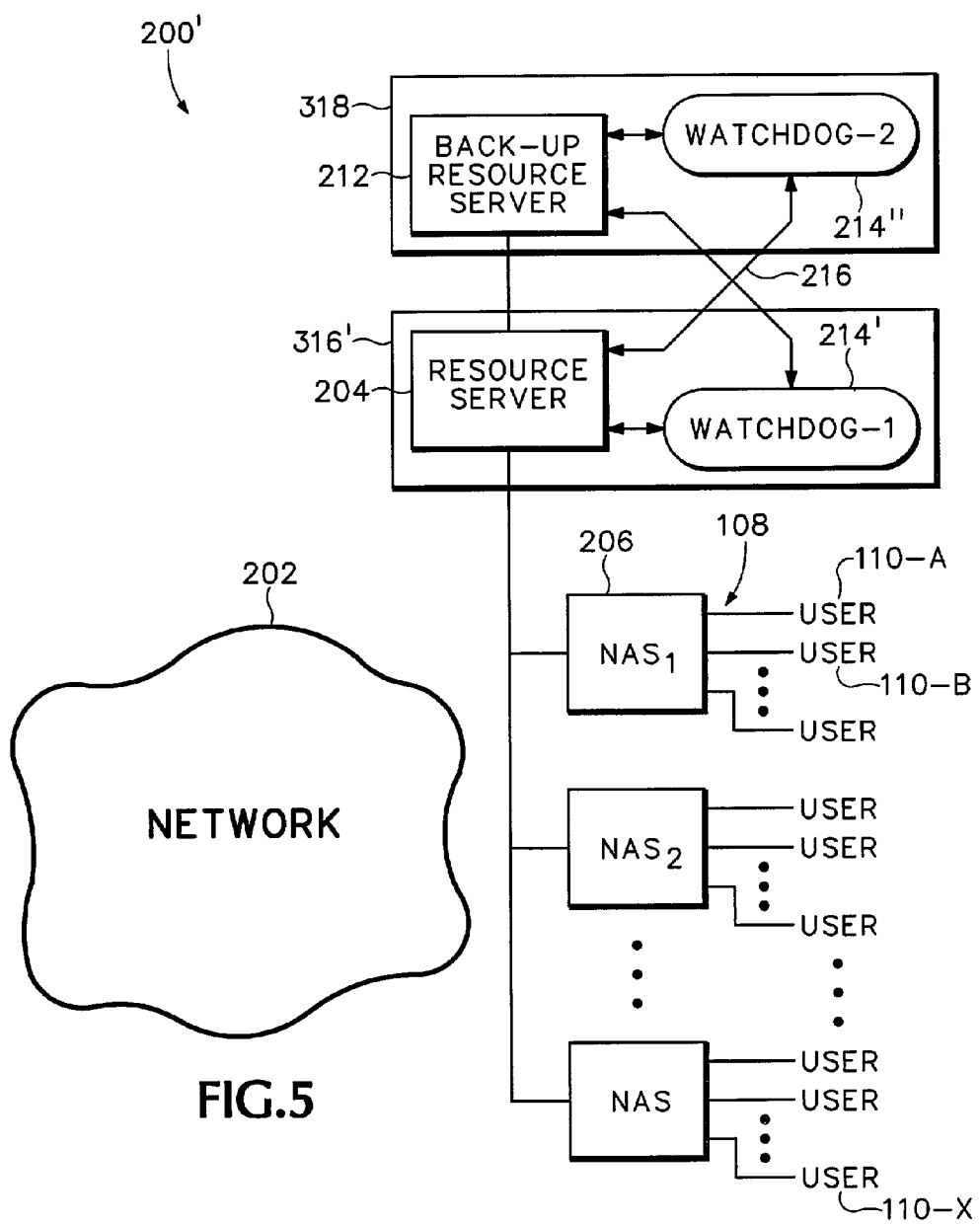
FIG. 5 shows a simplified block diagram of a wholesale network in accordance with a further embodiment of the present invention.

Again, returning to FIG. 2, because of the importance of resource management within a network, both a primary resource server 204 and a back-up resource server 212 may be incorporated within a wholesale network 200. Further referencing FIG. 5, in accordance with an embodiment of the present invention, a first watchdog 214' may monitor primary resource server 204 within the same machine 316' as that of the primary server. Additionally, a second watchdog 214" may also monitor primary resource server 204. In a particular embodiment, the second watchdog is in machine 318 remote primary server. By running one watchdog remotely and the other watchdog internally, errors may be more readily resolved to one of the primary resource server or a fault of the network. Upon identifying a problem with the primary resource manager 204, procedures may be initiated to begin transfer of resource management activities to the backup resource server 212.

In a particular embodiment, the server may comprise a Resource Pool Manager Server (RPMS) implemented as a software module that may run with Solaris on a Sun machine. The RPMS may be operable to coordinate management of hundreds of NASes. The NASes, in turn, may use a network protocol such as Terminal Access Controller Access Control System (TACACS). The watchdog(s) for such embodiment may send requests to the servers for emulating the TACACS protocol of the client NAS devices. For example, the watchdog may use a "NAS Update" TACACS message to monitor the operability of the server.

When operable, the server would be expected to respond with a TACACS acknowledgement. The watchdog would then verify that it received the acknowledgement and that the acknowledgement was received within a given time duration (e.g., 5 seconds). The watchdog might also check that the acknowledgement followed the TACACS protocol and was received error free. The watchdog may send such request periodically to continually test an operability of the primary server. For example, in one embodiment, the watchdog may send the request once every 60 seconds. However, the scope of the present invention may be understood to encompass other monitoring rates.

The second watchdog 214" in machine 318 of the backup resource server 212 may monitor the same type of information as that of first watchdog 214'. Additionally, in this particular embodiment, the respective processes of the different watchdogs may be performed separately. Furthermore, the watchdog of at least one of the backup machine 318 or primary machine may be operable to resolve differences between the analysis of the primary and secondary devices. For example, when the second watchdog determines that it took too long to receive a reply from the primary server, it may then query the first watchdog before identifying that the primary server may be down.

In contrast, the first watchdog (which is in the same machine 316' as the primary server) may be operable to initiate procedures for a server replacement absent information of the second watchdog.

In further embodiments of the present invention, the watchdog(s) may be operable to adopt protocols of different clients (e.g., NASes). Accordingly, for one client, the watchdog may be configurable to allow a 2 second duration before signaling an error. Yet, for another client, the watchdog may be alternatively configurable to wait as long as 5 seconds before signaling an error. Additionally, different clients may be operative with different kinds of data per their associated protocols. The watchdog(s) may, therefore, be operable to first query the client devices and determine, e.g., the type of resource management protocol that is to be incorporated for the emulation requests and analysis.

In the drawings and specification, there have been disclosed typical embodiments of this invention and, although specific terms are employed, they may be used in a generic and descriptive sense and not for purposes of limitation. Additionally, it will be apparent to those skilled in this art that the particular embodiments illustrated or described herein are exemplary and that various changes and modifications may be made thereto as become apparent upon reading the present disclosure. Accordingly, such changes and modifications shall be deemed to fall within the scope of the appended claims.

What is claimed is:

1. A method of testing a server, comprising:
   generating an emulation request to emulate a request of a client;
   sending the emulation request to a resource manager for a network; and
   identifying an operability of the resource manager based on a reply of the resource manager within a predetermined period of time after the sending.

2. A method of testing a server, comprising:
   generating an emulation request to emulate a request of a client;
   sending the emulation request to a resource manager for a network; and
   identifying an operability of the resource manager based on a reply of the resource manager responsive to the emulation request;
   where the emulation request is adapted to emulate a request of a Network Access Server (NAS); and
   where the identifying includes identifying a pass/fail condition of the resource manager dependent on whether a response is received from the resource manager within a predetermined period of time after the sending.

3. A method according to claim 2, when a response is received, the identifying comprising:
   comparing the response received to predetermined data; and
   establishing a pass condition responsive to the comparison.

4. A method according to claim 3, the establishing of the pass condition further based on whether the reply follows a predetermined protocol.

5. A method according to claim 2, further comprising sending out an alert message responsive to the identifying of a fail condition.

6. A method according to claim 2, further comprising initiating a process to replace the resource manager with a backup resource manager responsive to identifying a fail condition.

7. A method according to claim 6, the initiating to enable synchronization of the backup resource manager for call counts representative of active calls of the NAS on the network.

8. A method according to claim 2, in which the generating and sending are performed in a machine the same as the resource manager.

9. A method of testing a server, comprising:
   generating an emulation request to emulate a request of a client;
   sending the emulation request to a resource manager for a network; and
   identifying an operability of the resource manager based on a reply of the resource manager responsive to the emulation request;
   generating, in a machine remote the resource manager, a second emulation request to emulate a request of a client; and
   sending the second emulation request to the resource manager;
   where the generating and sending are performed in a machine the same as the resource manager;
   where the identifying the operability is dependent on the response of the resource manager to the first and second emulation requests.

10. A method according to claim 9, in which the identifying further comprises:
    determining an operability of at least one of the resource manager and a network based on a response of the resource manager to the first request and its response to the second request.

11. A method of in-service network maintenance comprising:
    testing a responsiveness of a Resource Pool Manager Server (RPMS) within a network;
    replacing the RPMS with a backup server dependent upon the testing;
    sending a NAS type emulation request to the RPMS to emulate a Network Access Server (NAS);
    determining a reply of the RPMS in response to the emulation request; and
    identifying a functionality of the RPMS based on the reply determined.

12. A method according to claim 11, in which the identifying the functionality may be based on at least one of a receipt, accuracy and protocol of the reply.

13. A method of in-service network maintenance comprising:
    testing a responsiveness of a Resource Pool Manager Server (RPMS) within a network;
    replacing the RPMS with a backup server dependent upon the testing;
    emulating a network access server (NAS) within a first machine the same as that containing the RPMS, the emulating to include sending a first NAS-type emulation request to the RPMS within the first machine; and
    emulating a second NAS within a second machine different from that of the RPMS, the emulating the second NAS to include sending a second NAS emulation request via the network from the second machine to the RPMS in the first machine; and
    determining an operability of at least one of the network and RPMS dependent upon the responsiveness of the RPMS to the first and second NAS emulation requests.

14. A method according to claim 13, in which the emulating the second NAS is performed in the second machine the same as that of a backup RPMS.

15. A method according to claim 14, further comprising initiating a synchronization of the backup RPMS to the network's NAS devices if the determining identifies a lack of responsiveness of the RPMS.

16. A method according to claim 13, in which the determining establishes the operability based upon at least one of the existence, timeliness, accuracy and protocol of the reply of the RPMS.

17. A resource server for a network, comprising
a primary resource server to administer resources of a network for serving clients; a first watchdog to send an emulation request to the primary resource server for emulating a client;
the first watchdog to identify a failure of the primary resource manager based upon a responsiveness of the primary resource manager to emulation requests of the first watchdog.

18. A resource server according to claim 17, further comprising:
a secondary resource server selectably operable to administer the resources of the network as a backup to the primary resource server;
the first watchdog further operable to initiate a substitution of the primary resource server with the secondary resource manager responsive to identifying a failure of the primary resource manager.

19. A resource server according to claim 18, further comprising:
a second watchdog to send an emulation request to the primary resource server for emulating a client;
the second watchdog to identify a failure of the primary resource manager based upon a responsiveness of the primary resource manager to emulation requests of the second watchdog; and
the second watchdog further operable to initiate a substitution of the primary resource server with the secondary resource manager responsive to its identifying the failure of the primary resource manager.

20. A resource server according to claim 19, in which:
the first watchdog and primary resource server reside in a first network device; and
the second watchdog and secondary resource server reside in a second network device;
the second network device separate from the first network device and coupled thereto by a portion of the network.

21. A resource server according to claim 20, in which at least one of the first and second network devices further comprises means to identify an operability of the network between the first and second network devices based upon the responsiveness of the primary resource server to the first and second emulation requests of the respective first and second watchdogs.

22. A resource server according to claim 17, further comprising means to generate an alert request responsive to the first watchdog identifying a failure of the primary resource server.

23. A computer program product having a computer readable medium with computer readable program code stored thereon that causes the computer to:
generate an emulation request to emulate a request of a client;
send the emulation request to a resource server; and
identify an operability of the resource server based on its reply to the emulation request within a predetermined period of time after the sending.

24. A computer program product of claim 23, in which the code is further operable to cause the machine to:
emulate a request of a Network Access Server as the emulation request; and
identify the operability as a pass/fail condition dependent on whether a response is received from the resource server within a predetermined period of time after sending the emulation request.

25. A computer program product of claim 24, in which the code is further operable to cause the machine to send an alert message responsive to identifying a fail condition for the resource server.

26. A computer program product of claim 24, in which the code is further operable to cause the machine to initiate a process to replace the resource server with a backup resource server responsive to identifying a fail condition for the resource server.

27. A network device, comprising
a watchdog to send an emulation request to a primary resource server of a network, the emulation request to emulate a client;
the watchdog to identify a failure of the primary resource manager based upon a responsiveness of the primary resource manager to the emulation request.

28. A network device according to claim 27, further comprising a resource server to manage resources of the network as the primary resource server.

29. A network device according to claim 27,
the watchdog further operable to initiate procedures for at least one of replacing or recovering the primary resource server responsive to identifying a failure of the primary resource manager.

30. A network device according to claim 27, further comprising means to generate an alert request responsive to the watchdog identifying a failure of the primary resource server.

31. An apparatus, comprising:
means for sending an emulation request to a resource server for a network, the emulation request to emulate a request of a client; and
means for identifying a failure of the resource server based on a reply from of the resource server to the emulation request.

32. An apparatus, comprising:
means for sending an emulation request to a resource server for a network, the emulation request to emulate a request of a client; and
means for identifying an operability of the resource server based on a reply of the resource server to the emulation request;
the means for sending the emulation request to emulate a request of a Network Access Server (NAS); and
the means for identifying to identify a pass/fail condition of the resource server dependent on at least one of the timeliness, protocol and accuracy of the reply of the resource server.

33. An apparatus according to claim 32, further comprising means for initiating a procedure to replace the resource server responsive to the identification means identifying a fail condition.

* * * * *